US012526150B2

(12) United States Patent
Xu

(10) Patent No.: US 12,526,150 B2
(45) Date of Patent: Jan. 13, 2026

(54) DATA STORAGE DEVICE, DATA STORAGE METHOD, AND NON-TRANSITORY COMPUTER READABLE STORAGE MEDIUM

(71) Applicant: DENSO CORPORATION, Kariya (JP)

(72) Inventor: Xin Xu, Kariya (JP)

(73) Assignee: DENSO CORPORATION, Kariya (JP)

( * ) Notice: Subject to any disclaimer, the term of this patent is extended or adjusted under 35 U.S.C. 154(b) by 264 days.

(21) Appl. No.: 18/339,113

(22) Filed: Jun. 21, 2023

(65) Prior Publication Data

US 2023/0336356 A1 Oct. 19, 2023

Related U.S. Application Data

(63) Continuation of application No. PCT/JP2021/042863, filed on Nov. 23, 2021.

(30) Foreign Application Priority Data

Dec. 25, 2020 (JP) .................................. 2020-216399

(51) Int. Cl.
*H04L 9/32* (2006.01)
*H04L 9/00* (2022.01)

(52) U.S. Cl.
CPC .............. *H04L 9/3236* (2013.01); *H04L 9/50* (2022.05)

(58) Field of Classification Search
CPC .................................. H04L 9/50; H04L 9/3326
See application file for complete search history.

(56) References Cited

U.S. PATENT DOCUMENTS

| 2018/0234248 | A1* | 8/2018 | Imamoto | ............. | H04L 63/0428 |
| 2019/0367082 | A1 | 12/2019 | Sugamoto et al. | | |
| 2020/0167459 | A1* | 5/2020 | Viale | ....................... | G06F 16/27 |
| 2021/0362780 | A1 | 11/2021 | Sugamoto et al. | | |

OTHER PUBLICATIONS

Okabe et al., "Development of Blockchain Technology to Protect Mobility Data and Traceability Data", Jan. 1, 2019 (Jan. 1, 2019), Denso Technical Review, vol. 24, Japan, pp. 42-52, Japanese language (Year: 2019).*
Okabe et al., "Development of Blockchain Technology to Protect Mobility Data and Traceability Data", Jan. 1, 2019 (Jan. 1, 2019), Denso Technical Review, vol. 24, Japan, pp. 42-52, Machine English language (Year: 2019).*
Keisuke Takemori, "Security for Connected Car", IATSS Review, vol. 42, No. 2, (Oct. 2017), pp. 39-47.

* cited by examiner

*Primary Examiner* — Luu T Pham
*Assistant Examiner* — Paul J Skwierawski
(74) *Attorney, Agent, or Firm* — Maschoff Brennan

(57) ABSTRACT

An acquisition data acquired by a mobile object is stored using a blockchain with defining a normal world and a secure world. A new block to be connected to the blockchain is generated based on at least a block hash value generated from a previous block. A final block hash value stored at a previous update timing is updated by storing the final block hash value based on a final block connected to an end of the blockchain in a storage area of the secure world at each update timing. A data hash value based on the acquisition data and the final block hash value is generated at least for each update timing.

4 Claims, 8 Drawing Sheets

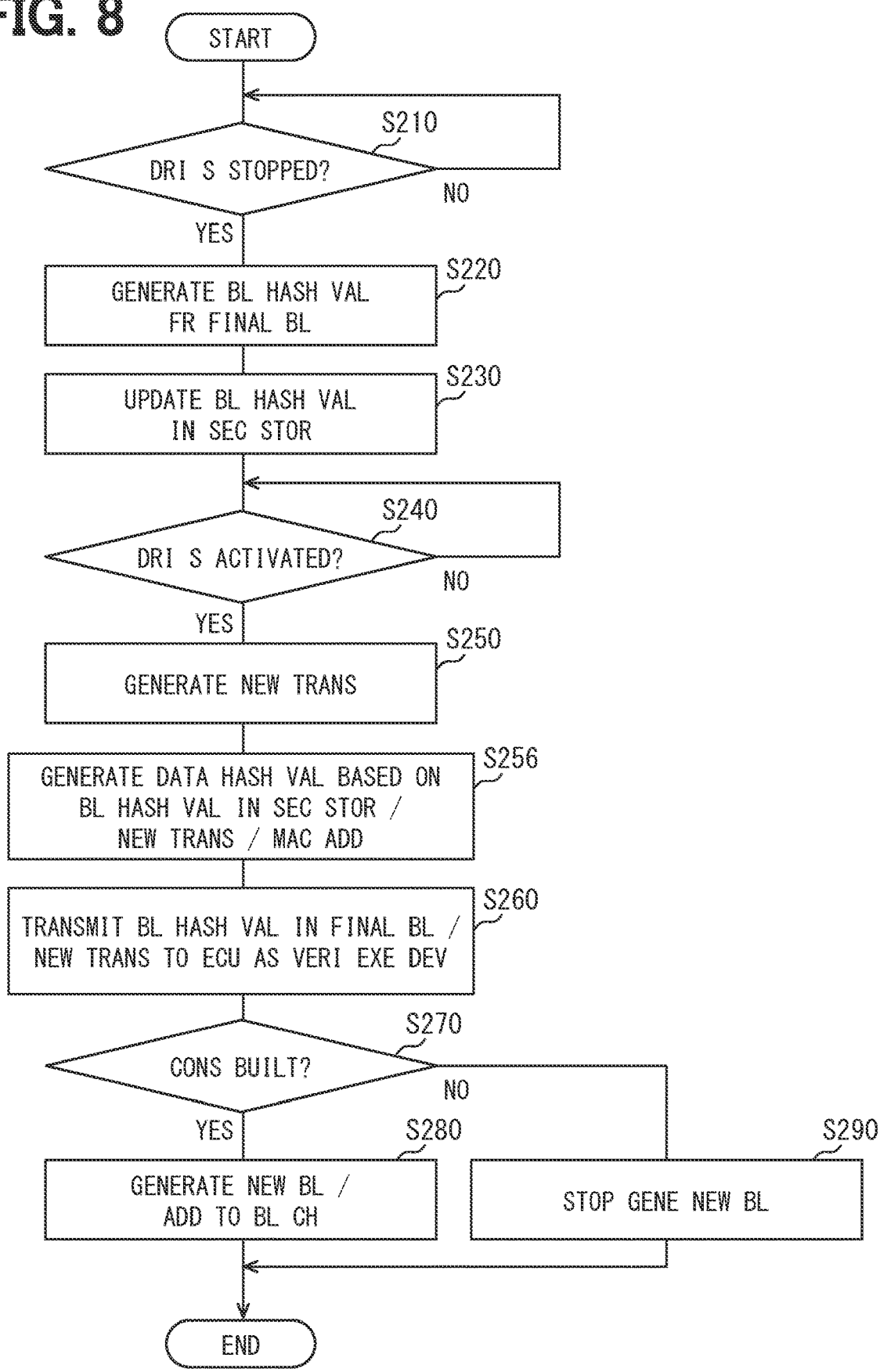

DATA STORAGE DEVICE, DATA STORAGE METHOD, AND NON-TRANSITORY COMPUTER READABLE STORAGE MEDIUM

CROSS REFERENCE TO RELATED APPLICATIONS

The present application is a continuation application of International Patent Application No. PCT/JP2021/042863 filed on Nov. 23, 2021, which designated the U.S. and claims the benefit of priority from Japanese Patent Application No. 2020-216399 filed on Dec. 25, 2020. The entire disclosures of all of the above applications are incorporated herein by reference.

TECHNICAL FIELD

The disclosure in this specification relates to a technique for storing data acquired by a mobile object.

BACKGROUND

A conceivable technique teaches a technique of assigning an encryption key to an in-vehicle ECU and authenticating a proper ECU based on the encryption key.

SUMMARY

According to an example, an acquisition data acquired by a mobile object is stored using a blockchain with defining a normal world and a secure world. A new block to be connected to the blockchain is generated based on at least a block hash value generated from a previous block. A final block hash value stored at a previous update timing is updated by storing the final block hash value based on a final block connected to an end of the blockchain in a storage area of the secure world at each update timing. A data hash value based on the acquisition data and the final block hash value is generated at least for each update timing.

BRIEF DESCRIPTION OF THE DRAWINGS

The above and other objects, features and advantages of the present disclosure will become more apparent from the following detailed description made with reference to the accompanying drawings. In the drawings:

FIG. 8 is a flowchart showing an example of a process executed by an ECU as a verification target in the data storage method according to the second embodiment.

DETAILED DESCRIPTION

Figure 1:
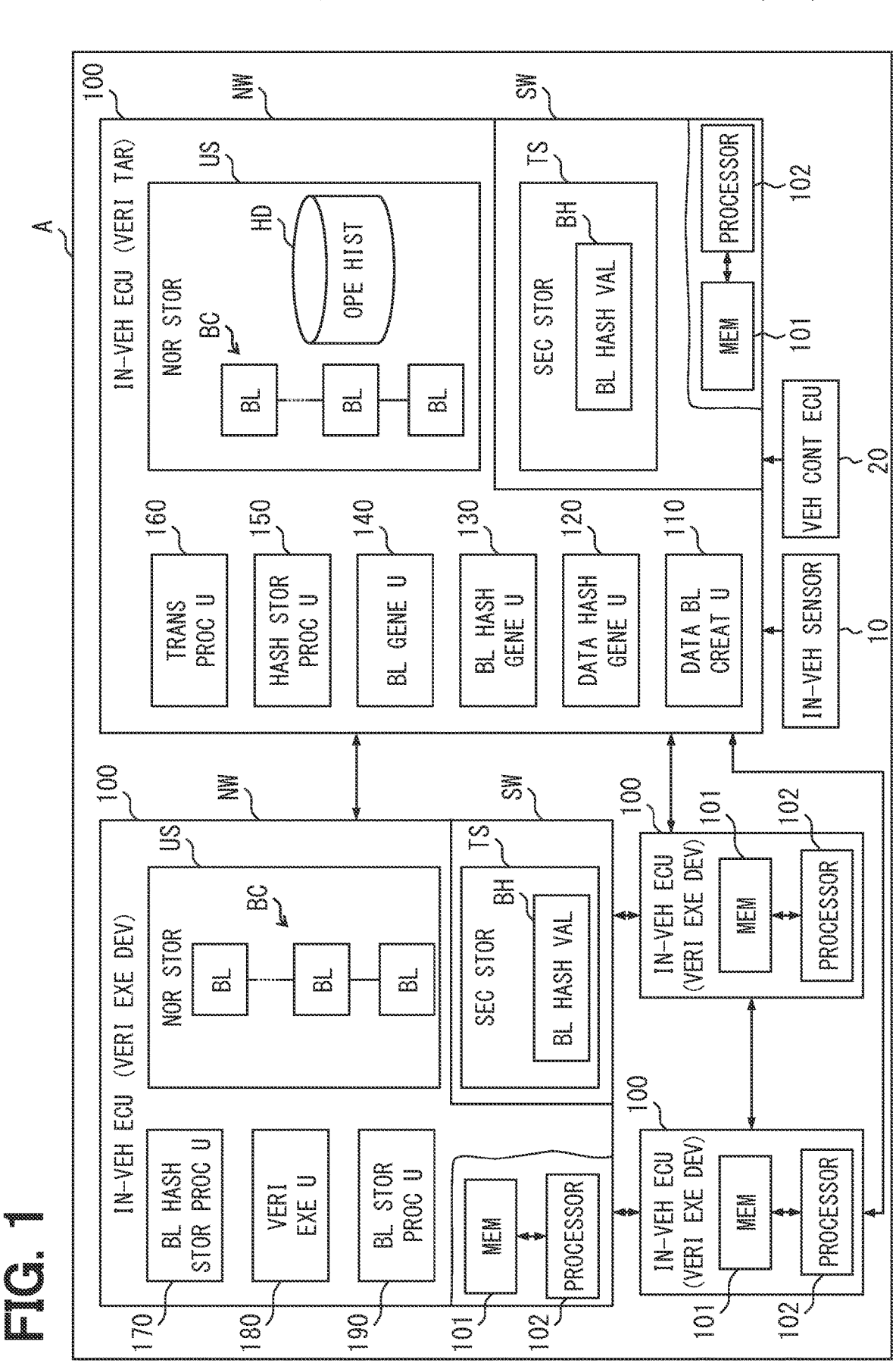
FIG. 1 is a block diagram showing an example of a function executed by an in-vehicle ECU.

In a conceivable technique, even when an encryption key is assigned to an in-vehicle ECU, if the encryption key is leaked, there may be a risk that data can be easily falsified by installing a false in-vehicle ECU. The conceivable technique does not teach any countermeasures against such a situation.

An object of the embodiments is to provide a data storage device, a data storage method, and a data storage program capable of making falsification of data difficult.

A data storage device according to one of the embodiments is mounted on a mobile object, defines a normal world and a secure world to which access from the normal world is restricted, and stores acquired data acquired by the mobile object using a blockchain.

The data storage device includes:
 a block generation unit that generates a new block to be connected to a blockchain based on at least a block hash value generated from a previous block;
 a storage unit that update a final block hash value stored at a previous update timing by storing a new final block hash value in a storage area of the secure world based on a final block connected to an end of the block chain at each specific update timing; and
 a data hash generation unit that generates a data hash value, which is a hash value based on the acquired data and the final block hash value, at least at each update timing.

A data storage method according to embodiments is used for a mobile object, defines a normal world and a secure world to which access from the normal world is restricted, and stores an acquired data acquired by the mobile object using a blockchain.

The data storage method is executed by a processor and includes:
 a block generation process for generating a new block to be connected to a blockchain based on at least a block hash value generated from a previous block;
 a storage process for updating a final block hash value stored at a previous update timing by storing a new final block hash value in a storage area of the secure world based on a final block connected to an end of the block chain at each specific update timing; and
 a data hash generation process for generating a data hash value, which is a hash value based on the acquired data and the final block hash value, at least at each update timing.

A data storage program according to embodiments is used for a mobile object, defines a normal world and a secure world to which access from the normal world is restricted, and stores an acquired data acquired by the mobile object using a blockchain.

The data storage program includes instructions executed by a processor.

The instructions includes:
 a block generation process for generating a new block to be connected to a blockchain based on at least a block hash value generated from a previous block;
 a storage process for updating a final block hash value stored at a previous update timing by storing a new final block hash value in a storage area of the secure world based on a final block connected to an end of the block chain at each specific update timing; and a data hash generation process for generating a data hash value, which is a hash value based on the acquired data and the final block hash value, at least at each update timing.

According to these embodiments, the final block hash value stored in the storage area is updated at specific update timings. When the data is falsified by installing a false data storage device, and the like, the final block hash value and the new data hash value are different from the original values. Thus, it is possible to verify the presence or absence of falsification based on at least one of the values. Furthermore, since these values change at each update timing, falsification can be detected even if these values at the previous update timing are leaked. As described above, it is possible to provide a data storage device, a data storage method, and a data storage program capable of making falsification of data difficult.

First Embodiment

A data storage device according to the first embodiment will be described with reference to FIGS. 1 to 6. The data storage device of the first embodiment is provided by an in-vehicle ECU 100, which is an electronic control device mounted on a vehicle A as an example of a mobile object. The in-vehicle ECU 100 stores acquired data acquired by the vehicle A, particularly operation history data HD of the vehicle A.

The in-vehicle ECU 100 is a plurality of information processing devices mounted on the vehicle A, for example, four or more devices. A plurality of in-vehicle ECUs 100 can communicate with each other via an in-vehicle network conforming to a communication standard such as Ethernet (registered trademark). The in-vehicle ECU 100 can execute processing functions other than a storage function and a verification function of acquired data, which will be described later. For example, the in-vehicle ECU 100 may be capable of executing an automatic driving function, an advanced driving support function, a peripheral monitoring function, and the like. Also, one of the in-vehicle ECUs 100 may be provided by a vehicle control ECU 20 (described later). The in-vehicle ECU 100 is connected to the in-vehicle sensor 10 and the vehicle control ECU 20 via an in-vehicle network.

The in-vehicle sensors 10 are various types of detection structures mounted in the vehicle A. The in-vehicle sensor 10 includes a sensor capable of detecting the operation of the vehicle A by the driver. For example, the in-vehicle sensor 10 includes an accelerator pedal sensor that detects the amount of depression of an accelerator pedal, a brake pedal sensor that detects the amount of depression of a brake pedal, a steering sensor that detects the amount of operation of a steering wheel, and the like. Each in-vehicle sensor 10 can provide detected data to at least one in-vehicle ECU 100. The in-vehicle sensor 10 may indirectly provide the detection data to the in-vehicle ECU 100 via another ECU that collects the detection data.

The in-vehicle ECU 100 includes a plurality of electronic control units mounted on the vehicle A. At least one of the in-vehicle ECUs 100 is a data storage device that stores the acquired data from the in-vehicle sensor 10 and the blockchain BC. Another in-vehicle ECU 100 stores the blockchain BC and verifies the authenticity of the blockchain BC. Hereinafter, the former in-vehicle ECU 100 may be referred to as a "verification target ECU", and the latter in-vehicle ECU 100 may be referred to as a "verification execution ECU".

The ECU 100 mainly includes a memory 101, a processor 102, an input/output interface, a bus connecting these components, and the like. The processor 102 is a hardware for arithmetic processing. The processor 102 includes, as a core, at least one type of, for example, a CPU (Central Processing Unit), a GPU (Graphics Processing Unit), an RISC (Reduced Instruction Set Computer) CPU, and so on.

The in-vehicle ECU 100 defines at least two different processing areas within the system, i.e., a normal world NW and a secure world SW. The normal world NW and the secure world SW may be physically separated on hardware, or may be virtually separated by cooperation of hardware and software. The in-vehicle ECU 100 temporally separates resources necessary for the execution of applications, in the normal world NW and the secure world SW, by utilizing the functions of context switches and the like.

The normal world NW is a normal area for executing operation systems and applications. The normal world NW is provided with a normal storage US, as a storage area (Untrusted Storage) for storing data.

The Secure World SW is an area isolated from the Normal World NW. In the secure world SW, secure operation systems and applications for processing required to have security are executed. Access to the secure world SW from the normal world NW is restricted by a function of the processor 102. Therefore, the existence of the secure world SW cannot be recognized from the normal world NW, and the safety of the processing executed in the secure world SW and the information stored in the secure world SW is ensured. The secure world SW is provided with a secure storage TS, as a storage area (Trusted Storage) for storing data. The capacity of the secure storage TS may be made smaller than the capacity of the normal storage US. Alternatively, the capacity of the secure storage TS may be equal to or greater than the capacity of the normal storage US.

The memory 101 is at least one type of non-transitory tangible storage medium, such as a semiconductor memory, a magnetic storage medium, and an optical storage medium, for non-transitory storing or memorizing computer readable programs and data. The memory 101 stores various programs executed by the processor 102, such as a data storage program described later.

The processor 102 executes multiple instructions included in the data storage program stored in the memory 101. Accordingly, the in-vehicle ECU 100 constructs a plurality of functional units for data storage. As described above, in the n-vehicle ECU 100, the data storage program stored in the memory 101 causes the processor 102 to execute a plurality of instructions, thereby constructing a plurality of functional units. Specifically, as shown in FIG. 1, the in-vehicle ECU 100 includes a data block creation unit 110, a data hash generation unit 120, a block hash generation unit 130, a block generation unit 140, a hash storage processing unit 150, and a transmission processing unit 160. In addition, the in-vehicle ECU 100 includes a block hash storage processing unit 170, a verification execution unit 180, a block storage processing unit 190, and the like, as shown in FIG. 1.

Among the above functional units, the data block creation unit 110, the data hash generation unit 120, the block hash generation unit 130, the block generation unit 140, the hash storage processing unit 150, and the transmission processing unit 160 are built in the verification target ECU. Also, the block hash storage processing unit 170, the verification execution unit 180, and the block storage processing unit 190 are functional units built in the verification execution ECU. In FIG. 1, each function is described as a different function of the in-vehicle ECU 100, alternatively, each in-vehicle ECU 100 may function as both a verification target device and a verification execution device.

The data block creation unit 110 acquires detection data detected by the in-vehicle sensor 10 as the driver's operation history data HD, and creates a data block. A data block may be referred to as a transaction below. The transaction is a unit for collectively storing the operation history data HD with the predetermined size. The data block creation unit 110 periodically creates transactions while the drive source of the vehicle A is activated. The data block creation unit 110 stores the created transaction in the normal storage US in a state of being linked with a block BL connected to a blockchain BC, which will be described later. The data block creation unit 110 provides the created transaction to the data hash generation unit 120 and the block generation unit 140.

When the data block creation unit 110 determines that the drive source of the vehicle A has stopped, it stops creating the transaction. When the data block creation unit 110 determines that the drive source of the vehicle A has been activated, it restarts creating the transactions. In the following, a newly generated transaction may be particularly referred to as a "new transaction". Here, "immediately after activation of the drive source" means the timing after the activation of the drive source and before the authenticity of the in-vehicle ECU 100 is ensured. In addition, it may also be described that "immediately after activation of the driving source" is the timing at which the data block is generated for the first time after the activation of the drive source. This timing is an example of the "second timing".

The data hash generation unit 120 generates a hash value based on the created transaction as a data hash value.

Figure 2:
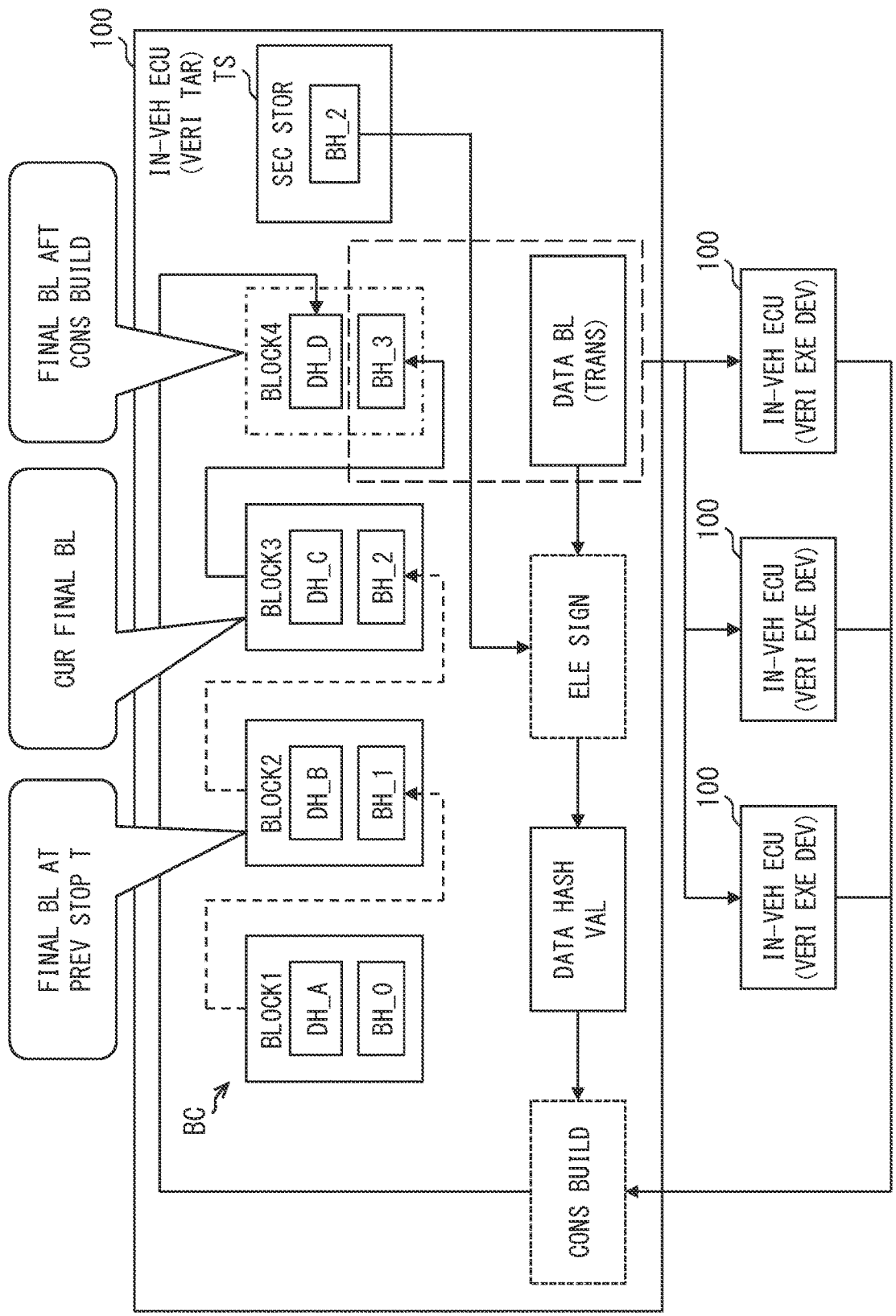
FIG. 2 is a conceptual diagram showing an example of a data storage method.
Figure 3:
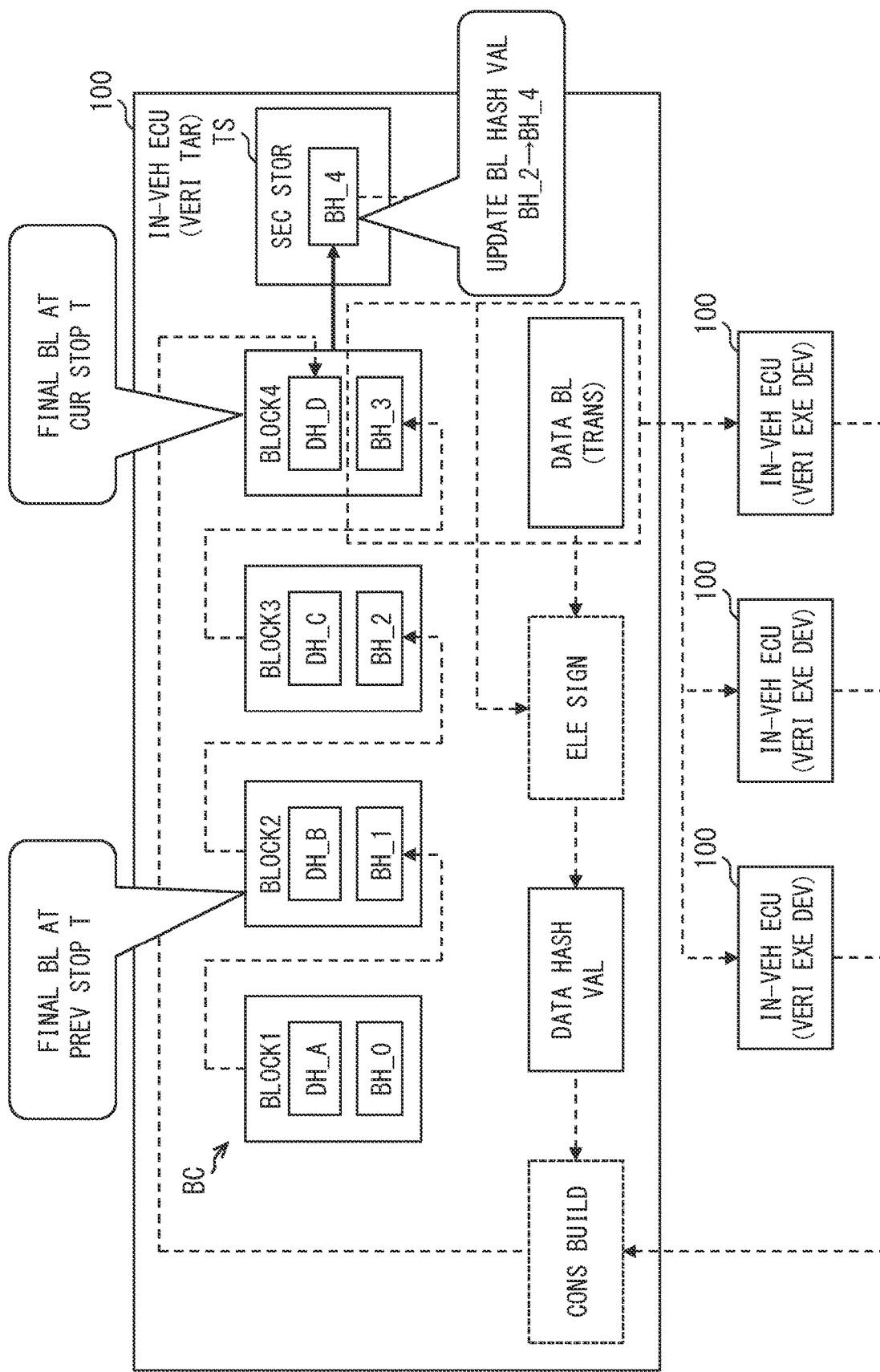
FIG. 3 is a conceptual diagram showing an example of an update method for a block hash value.

Specifically, as shown in FIG. 2, the data hash generation unit 120 converts a synthesized value between the block hash value BH (BH_1) stored in the secure storage TS and the transaction into a data hash value. This process may be understood as a process of applying an electronic signature to a transaction. In the following, the newly generated data hash value may be particularly referred to as "new data hash value". The data hash generation unit 120 provides the data hash value to the block generation unit 140.

The block hash generation unit 130 generates a hash value based on the final block, which is the final block BL connected to the blockchain BC, as a block hash value BH. This block hash value BH is an example of the "final block hash value". In the example shown in FIG. 2, the final block is "BLOCK 3" and the block hash value BH is "BH_3". The block hash generation unit 130 may simply convert the block into a block hash value BH using a hash function. The block hash generation unit 130 provides the block hash value BH to the block generation unit 140 and the transmission processing unit 160.

The data hash generation unit 120 and the block hash generation unit 130 described above use a cryptographic hash function in generating the hash value. Such a cryptographic hash function has characteristics such that the cryptographic hash function does not output the same hash value in response to different inputs, and it is substantially impossible to estimate the input from a hash value output from the function. For example, SHA-256, which is one of SHA-2, is used as a cryptographic hash function. Alternatively, cryptographic hash functions such as SHA-2 and SHA-3 other than SHA-1 and SHA-256 may be used as appropriate according to the required output length (i.e., the number of bits).

The block generation unit 140 generates a block BL by combining the data hash value obtained from the data hash generation unit 120 and the block hash value BH obtained from the block hash generation unit 130. Also, the block generation unit 140 connects the generated block to the end of the block chain BC to store it.

Here, the block generation unit 140 performs the above processing only when a consensus is formed to connect the new block BL. More specifically, the block generation unit 140 first acquires the verification result transmitted from the verification execution ECU. For example, the block generation unit 140 acquires the verification result performed by three or more other in-vehicle ECUs 100. The verification result includes at least determination information for determining whether or not to approve the authenticity of the in-vehicle ECU 100.

Then, based on the acquired verification results, the block generation unit 140 generates a new block BL and connects the new block BL when the authenticity of the data is approved by the majority of the verification execution ECUs. In the example shown in FIG. 2, BLOCK 4, which is a combination of DH_D (i.e. the data hash value) and BH_3 (i.e., the block hash value), is connected after BLOCK 3 as a new block. The block generation unit 140 suspends the connection of the new block BL when the authenticity of the data is not approved by the majority of the verification execution ECUs.

The hash storage processing unit 150 stores the block hash value BH in the secure storage TS at specific timing. The hash storage processing unit 150 uses, for example, the timing at which the drive source of the vehicle A is stopped as the timing for storage. At this time, the hash storage processing unit 150 updates the block hash value BH stored at the previous stop timing with the new block hash value BH. In the example shown in FIG. 3, BH_2, which is the block hash value generated from BLOCK 2 as the final block at the previous stop timing, is updated to BH_4, which is the block hash value generated from BLOCK 4 as the final block at the current stop timing. For example, the hash storage processing unit 150 determines that it is the stop timing when a signal (i.e., the stop signal) that enables determination of the stop of the drive source is acquired from the vehicle control ECU 20. The stop signal may be a stop state signal indicating that the drive source is in a stopped state, or may be a stop instruction signal that instructs stop of the drive source. The stop timing is an example of "update timing".

The transmission processing unit 160 performs transmission processing of information that needs to be provided to other in-vehicle ECUs 100 in generating the blockchain BC or verifying the in-vehicle ECU 100. Specifically, the transmission processing unit 160 transmits the transaction and the block hash value BH generated from the final block of the block chain BC at that time to the other in-vehicle ECU 100. Note that, hereinafter, the block hash value BH generated by the verification target ECU may be referred to as a target block hash value. The transmission processing unit 160 is an example of a "transmission unit".

The block hash storage processing unit 170 stores the block hash value BH in the secure storage TS at the timing of stopping the drive source in the verification execution ECU. The block hash storage processing unit 170 may generate the block hash value BH from the final block of the block chain BC stored in its own normal storage US, or may acquire the block hash value BH from the verification target ECU. Here, "the blockchain BC stored in its own normal storage US" means the blockchain BC distributed from the verification target ECU.

The verification execution unit 180 verifies the authenticity of the verification target ECU, and generates the determination information as to whether or not to approve the verification target ECU. The verification execution unit 180 acquires the new transaction and the target block hash value transmitted from the verification target ECU, and executes verification based on this information and the information stored by itself. The verification execution unit 180 generates a data hash value (i.e., a corresponding data hash value) based on the corresponding block hash value, which is the block hash value BH stored in its own secure storage TS, and the new transaction acquired from the verification target ECU.

As an example, the verification execution unit 180 determines whether or not the block hash value (i.e., the corresponding block hash value) generated from the final block of the blockchain BC stored by itself matches the target block hash value. When it is determined that they match, the verification execution unit 180 generates the determination information indicating the approval of the authenticity of the verification target ECU. On the other hand, when it is determined that they do not match, the verification execution unit 180 generates the determination information indicating that the authenticity of the verification target ECU is not approved. The verification execution unit 180 transmits the generated determination information to the verification target ECU and the verification execution ECU.

The block storage processing unit 190 acquires the verification results transmitted from other verification execution ECUs. When the authenticity of the data is approved by a majority of the verification execution ECUs, the block storage processing unit 190 generate a data hash value from the transaction acquired from the verification target ECU and the block hash value BH stored in its own secure storage TS. The block storage processing unit 190 generates a block using the data hash value and the block hash value BH generated from the final block in its own blockchain BC, and stores the block by linking it to the blockchain BC of the normal storage US. Thereby, the block storage processing unit 190 can store the blockchain BC distributed from the verification target ECU.

Note that the block storage processing unit 190 may acquire the new block BL from the verification target ECU. The block storage processing unit 190 suspends the connection of the new block BL when the authenticity of the data is not approved by the majority of the verification execution ECUs.

Figure 4:
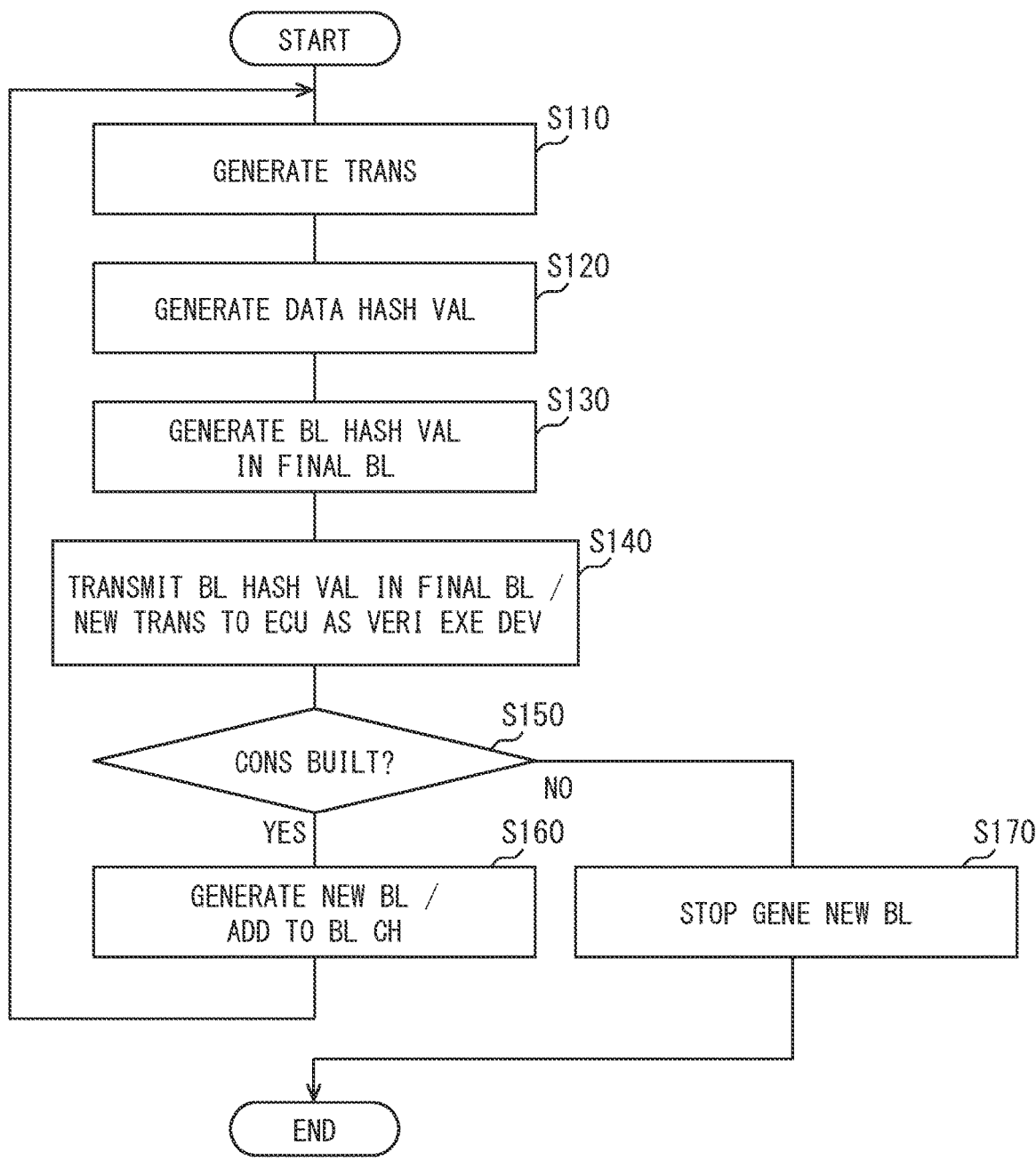
FIG. 4 is a flowchart showing an example of a block chain generation process in the data storage method.
Figure 5:
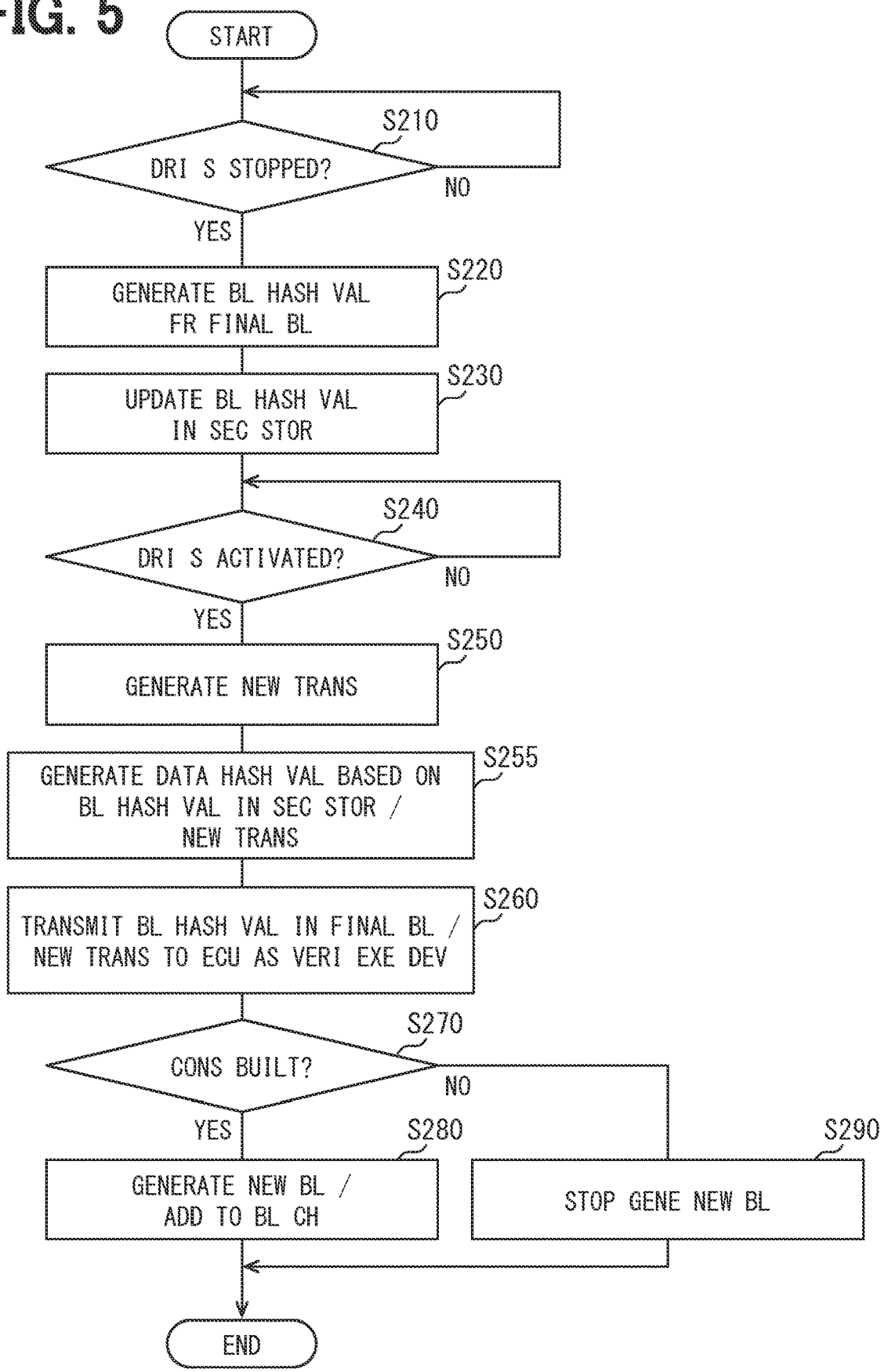
FIG. 5 is a flowchart showing an example of a process executed by an ECU as a verification target in the data storage method.

Next, the flow of the data storage method executed by the in-vehicle ECU 100 with collaboration operation of multiple functional blocks will be described below with reference to FIGS. 4 and 5. In a flowchart to be described later, "S" means multiple steps of the flowchart to be executed by multiple instructions included in the program.

First, in the data storage process, the process of generating the block chain BC based on the data acquired by the verification target ECU will be described with reference to FIG. 4. First, in S110, the data block creation unit 110 creates a transaction based on the acquired data. Next, in S120, the data hash generation unit 120 generates a data hash value based on the transaction.

In S130, the block hash generation unit 130 generates a block hash value BH based on the final block. Furthermore, in S140, the transmission processing unit 160 transmits the block hash value BH of the final block and the new transaction to the verification execution ECU. Then, in S150, the block generation unit 140 determines whether or not a majority consensus has been formed regarding the connection of the new blocks BL. When it is determined that a consensus has been formed, the flow shifts to S160. In S160, the block generation unit 140 generates a new block BL and connects it to the blockchain BC. After the process of S160, the flow returns to S110.

On the other hand, when it is determined in S150 that no consensus has been formed, the flow shifts to S170. In S170, the block generation unit 140 stops generating the new block BL, and this flow ends.

Next, in the data storage process, the process of verifying the authenticity of data will be described with reference to FIG. 5. First, in S210, the block hash generation unit 130 determines whether or not the driving source of the vehicle A has stopped. When it is determined that the drive source has not stopped, it waits until the unit 130 determines that the drive source has stopped. On the other hand, when it is determined that the drive source has stopped, in S220 the block hash generation unit 130 generates a block hash value BH from the final block. Next, in S230, the hash storage processing unit 150 stores the generated block hash value BH in the secure storage TS, and updates the previously stored block hash value BH.

In subsequent S240, the data hash generation unit 120 determines whether or not the drive source of the vehicle A has been activated. When it is determined that the drive source has not been activated, the unit 120 waits until it is determined that the drive source has been activated. On the other hand, when it is determined that the drive source has been activated, the data block creation unit 110 creates a new transaction in S250. In subsequent S255, the data hash generation unit 120 generates a new data hash value based on the block hash value BH stored in the secure storage TS and the new transaction. Further, in S260, the transmission processing unit 160 transmits the generated new transaction and the block hash value BH of the final block to the verification execution ECU.

Then, in S270, the block generation unit 140 determines whether or not a majority consensus has been formed based on the determination information from each in-vehicle ECU. When it is determined that a majority consensus has been formed, at S280, the block generation unit 140 generates a new block BL and adds the new block BL to the blockchain BC. After executing the process of S280, the block chain generation process shown in FIG. 4 may be started. On the other hand, when it is determined in S270 that a majority consensus has not been formed, in S290 the block generation unit 140 stops generating the new block BL.

Figure 6:
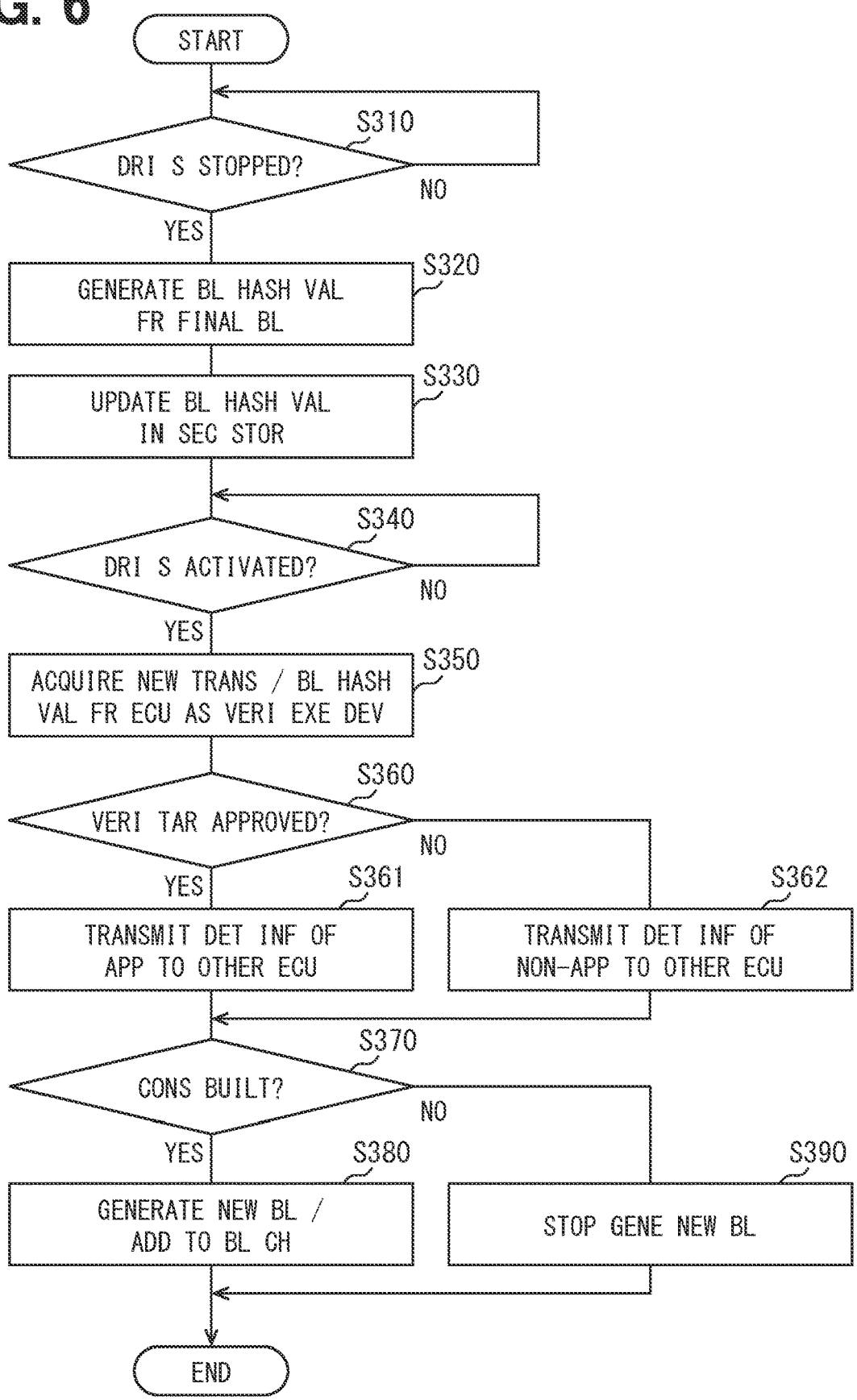
FIG. 6 is a flowchart showing an example of a process executed by an ECU as a verification execution device in the data storage method.

Next, in the data storage process, the process executed by the verification execution ECU will be described with reference to FIG. 6. The processing shown in FIG. 6 is executed while the in-vehicle ECU 100 is activated.

First, in S310, the block storage processing unit 190 determines whether or not the drive source of the vehicle A has stopped. When it is determined that the drive source has not stopped, it waits until the unit 130 determines that the drive source has stopped. On the other hand, when it is determined that the drive source has stopped, in S320 the block hash storage processing unit 170 generates a block hash value BH from the final block of the blockchain BC distributed from the verification target ECU. Next, in S330, the block hash storage processing unit 170 stores the generated block hash value BH in the secure storage TS, and updates the previously stored block hash value.

At S340, the verification execution unit 180 determines whether or not the drive source of the vehicle A has been activated. When it is determined that the drive source has not been activated, the unit 120 waits until it is determined that the drive source has been activated. On the other hand, when it is determined that the drive source has been activated, at S350, the verification execution unit 180 acquires a new transaction and a data hash value from the verification target ECU.

Then, in S360, the verification execution unit 180 determines whether or not to approve the verification target ECU. When it is determined to approve, the verification execution unit 180 transmits the determination information indicating that the addition of the new block BL is approved to the other in-vehicle ECUs 100 in S361.

On the other hand, when it is determined in S360 that the data hash values do not match, in S362, the verification execution unit 180 transmits the determination information indicating disapproval of the addition of the new block BL to the other in-vehicle ECUs 100. The subsequent processes of S370, S380 and S390 are equivalent to the processes of S270, S280 and S290 in FIG. 5. The processing of S370, S380, and S390 is executed by the block storage processing unit 190.

The above S140 and S150 are examples of the "block generation process", S210, S220 and S230 are examples of the "storage processing process", S120 and S255 are examples of the "data hash generation process", and S160 and S260 are examples of the "transmission process".

According to the first embodiment, the final block hash value stored in the storage area is updated at specific update timings. When the data is falsified by installing a false in-vehicle ECU and the like, the final block hash value and the new data hash value are different from the original values. Thus, it is possible to verify the presence or absence of falsification based on at least one of the values. Furthermore, since these values change at each update timing, falsification can be detected even if these values at the previous update timing are leaked. As described above, it may be possible to make falsification of data difficult.

Further, according to the first embodiment, the new data and the new data hash value are transmitted as verification information to three or more other in-vehicle ECUs 100. Then, when it is determined that three or more other in-vehicle ECUs 100 reach a majority consensus, a new block BL based on the new data hash value and the block hash value BH is generated and linked to the block chain BC. According to this, since the authenticity is determined by a majority consensus of three or more other in-vehicle ECUs 100, it is more reliable to secure the authenticity than in the case where the authenticity is determined by two or less other in-vehicle ECUs 100.

In addition, according to the first embodiment, the final block hash value stored in the secure storage TS is updated at the timing when the drive source of the vehicle A stops. Therefore, the final block hash value can be updated at the timing when the vehicle A is stopped during which the possibility of installing a false in-vehicle ECU is relatively high. Therefore, falsification by the false in-vehicle ECU 100 can be more certainly difficult.

Second Embodiment

Figure 7:
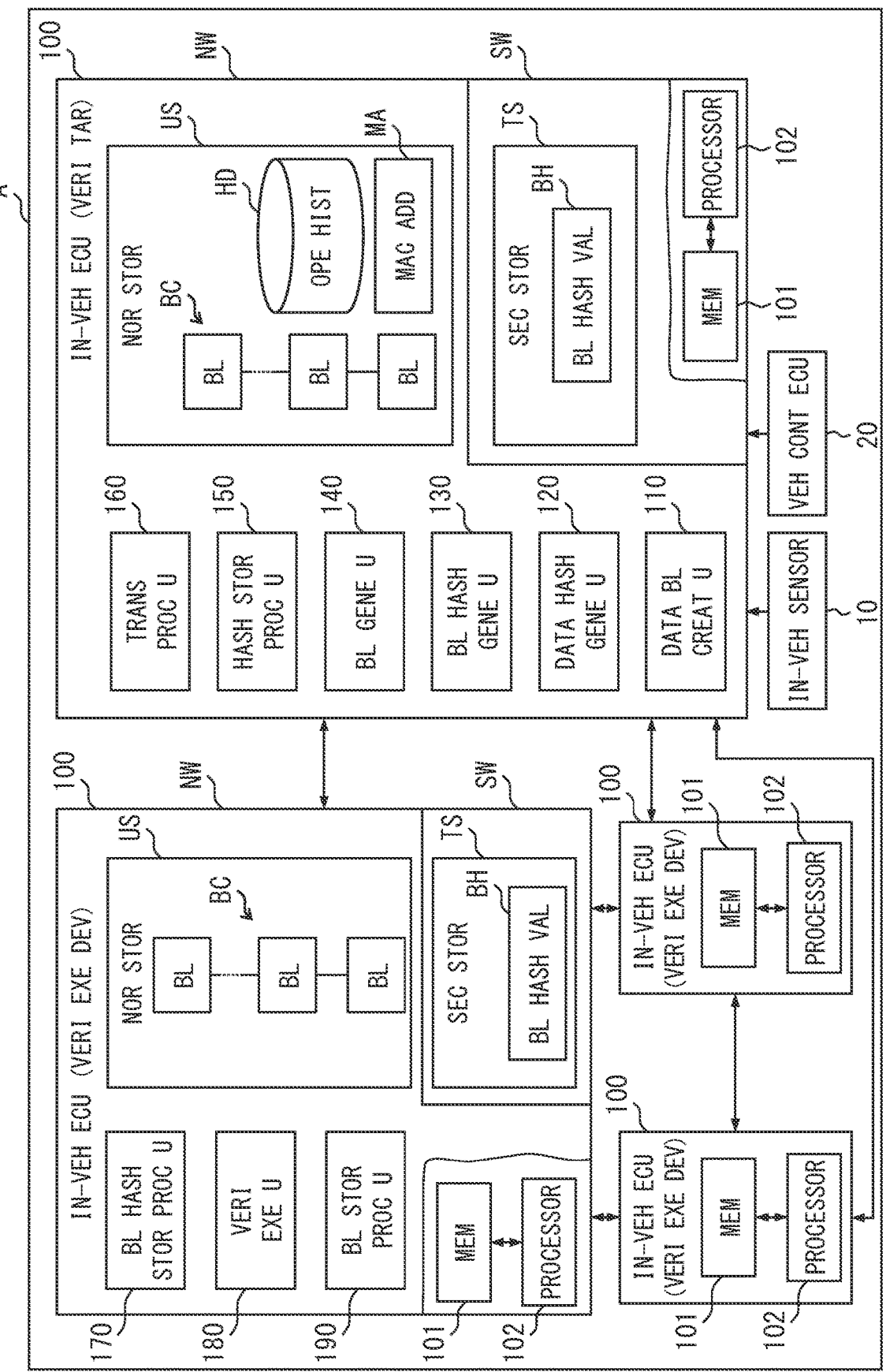
FIG. 7 is a block diagram showing an example of functions of an in-vehicle ECU according to a second embodiment.

In a second embodiment, a modification example of the in-vehicle ECU 100 described in the first embodiment will be described. In FIGS. 7 and 8, components denoted by the same reference numerals as those in the drawings of the first embodiment are the same components and exert similar operational effects.

The data hash generation unit 120 of the second embodiment uses preset key information in addition to the block hash value BH to generate a new data hash value. The key information is, for example, a MAC address MA that is identification information uniquely given to each in-vehicle ECU 100. The MAC address MA is stored in normal storage US. Alternatively, the key information may be any key value set in advance when the in-vehicle ECU 100 is manufactured. The data hash generation unit 120 obtains a new data hash value by synthesizing the new transaction, the block hash value BH and the MAC address MA and inputting them to the hash function. The data hash generation unit 120 executes the above processing after it is determined that the drive source is activated and a new transaction is generated (at S256).

According to the in-vehicle ECU 100 of the second embodiment, the preset key information is further used to generate a new data hash value. Therefore, it may be more difficult for a false in-vehicle ECU to generate a false new data hash value. Therefore, falsification by a false in-vehicle ECU can be checked more reliably.

Other Embodiments

The disclosure in the present specification is not limited to the above-described embodiments. The present disclosure includes embodiments described above and modifications of the above-described embodiments made by a person skilled in the art. For example, the present disclosure is not limited to a combination of the components and/or elements described in the embodiments. The present disclosure may be executed by various different combinations. The present disclosure may include additional configuration that can be added to the above-described embodiments. The present disclosure also includes modifications which include partial components/elements of the above-described embodiments. The present disclosure includes replacements of components and/or elements between one embodiment and another embodiment, or combinations of components and/or elements between one embodiment and another embodiment The disclosed technical scope is not limited to the description of the embodiments. It should be understood that some disclosed technical ranges are indicated by description of claims, and includes every modification within the equivalent meaning and the scope of description of claims.

In the above-described embodiment, the in-vehicle ECU 100 stores the driver's operation history data HD as the acquired data, alternatively, data other than the operation history data HD may be stored. For example, the in-vehicle ECU 100 may store the travel distance, the travel route, the vehicle driving behavior, and the like of the vehicle A.

In the above-described embodiment, the hash storage processing unit 150 determines that it is the stop timing when it acquires a stop signal from which it can be determined that the driving source has stopped. Alternatively, the hash storage processing unit 150 may determine that it is the stop timing when a predetermined time has passed since the stop signal was obtained. Alternatively, the hash storage processing unit 150 may determine that it is the stop timing when the stop signal is obtained and the power switch (e.g., ignition switch, and the like) of the vehicle A is in an off state.

In the above embodiment, the in-vehicle ECU 100 updates the block hash value BH of the secure storage TS at the timing when the drive source of the vehicle A stops. Alternatively, the in-vehicle ECU 100 may update the block hash value BH at regular intervals. Alternatively, the in-vehicle ECU 100 may update the block hash value BH each time a new block is generated. Further, the in-vehicle ECU

100 may update the block hash value BH at the timing when the shift position of the vehicle A is set to the parking range, and update the block hash value BH at the timing when the instruction signal is received from the server.

In the above-described embodiment, the verification target ECU transmits the new transaction and the new data hash value to three or more verification execution ECUs. Alternatively, the verification target ECU may transmit the new transaction and the new data hash values to two or less verification execution ECUs. In this case, approval of the verification target ECU may be performed by a method other than majority consensus.

In the above-described embodiment, the in-vehicle ECU 100 executes the data storage process. Alternatively, a data storage device mounted on a mobile object other than vehicle A may execute the data storage process. Mobile objects include ships, airplanes, railroad vehicles, and the like.

In the above-described embodiment, the block generation unit 140 generates a block BL by combining a data hash value and a block hash value. Alternatively, the block generation unit 140 may generate a block BL by combining a transaction and a block hash value. Alternatively, the block generation unit 140 may generate a block BL by combining the transaction, the data hash value, and the block hash value.

In the above-described embodiment, the data hash generation unit 120 converts a value obtained by synthesizing the block hash value and the transaction into a data hash value each time a transaction is generated. Alternatively, the data hash generation unit 120 may simply convert the transaction into a data hash value except immediately after the drive source is activated, and the data hash generation unit 120 may convert a value obtained by synthesizing the block hash value and the transaction into a data hash value immediately after the drive source is activated.

In the above-described embodiment, the transmission processing unit 160 transmits the transaction and the block hash value to the verification execution ECU. Alternatively, the transmission processing unit 160 may transmit the transaction and the data hash value generated from the transaction.

The in-vehicle ECU 100 of the modification may be a special purpose computer configured to include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

The in-vehicle ECU 100 may be provided by a set of computer resources linked by a computer or a data communication device. For example, a part of the functions provided by the in-vehicle ECU 100 in the above-described embodiments may be realized by another ECU.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S110. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A data storage device mounted on a mobile object and storing an
    acquisition data acquired by the mobile object using a blockchain with defining a normal world and a secure world to which access from the normal world is restricted, the data storage device comprising:
    a block generation unit that generates a new block to be connected to the blockchain based on at least a block hash value generated from a previous block;
    a storage processing unit that updates a final block hash value stored at a previous update timing by storing the final block hash value based on a final block connected to an end of the blockchain in a storage area of the secure world at each specific update timing;
    a data hash generation unit that generates a data hash value, which is a hash value based on the acquisition data and the final block hash value, at least for each specific update timing; and
    a transmission unit that transmits verification information for verifying, by three or more other information processing devices mounted on the mobile object, whether the new block is approved to connect to the blockchain, wherein:
    the block generation unit connects the new block to the blockchain when determining that three or more other information processing devices reach a majority consensus regarding a connection of the new block, wherein:
    the storage processing unit updates the final block hash value at a timing when a drive source of the mobile object stops, and
    the data hash generation unit generates the data hash value further using a preset key information.

2. The data storage device according to claim 1, further comprising:
    one or more processors, wherein:
    the one or more processors provides at least one of: the block generation unit; the storage processing unit; and the data hash generation unit.

3. A data storage method, used for a mobile object and executed by a processor, for storing an acquisition data acquired by the mobile object using a blockchain with defining a normal world and a secure world to which access from the normal world is restricted, the data storage method comprising:
    generating, by a block generation process, a new block to be connected to the blockchain based on at least a block hash value generated from a previous block;
    updating, by a storage processing process, a final block hash value stored at a previous update timing by storing the final block hash value based on a final block connected to an end of the blockchain in a storage area of the secure world at each specific update timing;
    generating, by a data hash generation process, generating a data hash value, which is a hash value based on the acquisition data and the final block hash value, at least for each specific update timing; and
    transmitting, by a transmission process, verification information for verifying, by three or more other information processing devices mounted on the mobile object, whether the new block is approved to connect to the blockchain, wherein:
    the block generation process further includes connecting the new block to the blockchain when determining that three or more other information processing devices reach a majority consensus regarding a connection of the new block, wherein:
    the storage processing process further includes: updating the final block hash value at a timing when a drive source of the mobile object stops; and
    the data hash generation process further includes: generating the data hash value further using a preset key information.

4. A non-transitory tangible computer readable storage medium
    comprising instructions being executed by a computer, the instructions, used for a mobile object, for storing an acquisition data acquired by the mobile object using a blockchain with defining a normal world and a secure world to which access from the normal world is restricted, wherein: the instructions includes:
a block generation process for generating a new block to be connected to the blockchain based on at least a block hash value generated from a previous block;
a storage processing process for updating a final block hash value stored at a previous update timing by storing the final block hash value based on a final block connected to an end of the blockchain in a storage area of the secure world at each specific update timing;
a data hash generation process for generating a data hash value, which is a hash value based on the acquisition data and the final block hash value, at least for each specific update timing; and
a transmission process for transmitting verification information for verifying, by three or more other information processing devices mounted on the mobile object, whether the new block is approved to connect to the blockchain, wherein:
the block generation process further includes connecting the new block to the blockchain when determining that three or more other information processing devices reach a majority consensus regarding a connection of the new block, wherein:
the storage processing process further includes: updating the final block hash value at a timing when a drive source of the mobile object stops; and
the data hash generation process further includes: generating the data hash value further using a preset key information.

* * * * *